May 6, 1958 G. R. SUTHERLAND ET AL 2,833,107
SIDE-DELIVERY RAKE
Filed April 19, 1956 2 Sheets-Sheet 1

*INVENTORS*
G. R. SUTHERLAND &
A. E. BREED

May 6, 1958   G. R. SUTHERLAND ET AL   2,833,107
SIDE-DELIVERY RAKE
Filed April 19, 1956   2 Sheets-Sheet 2
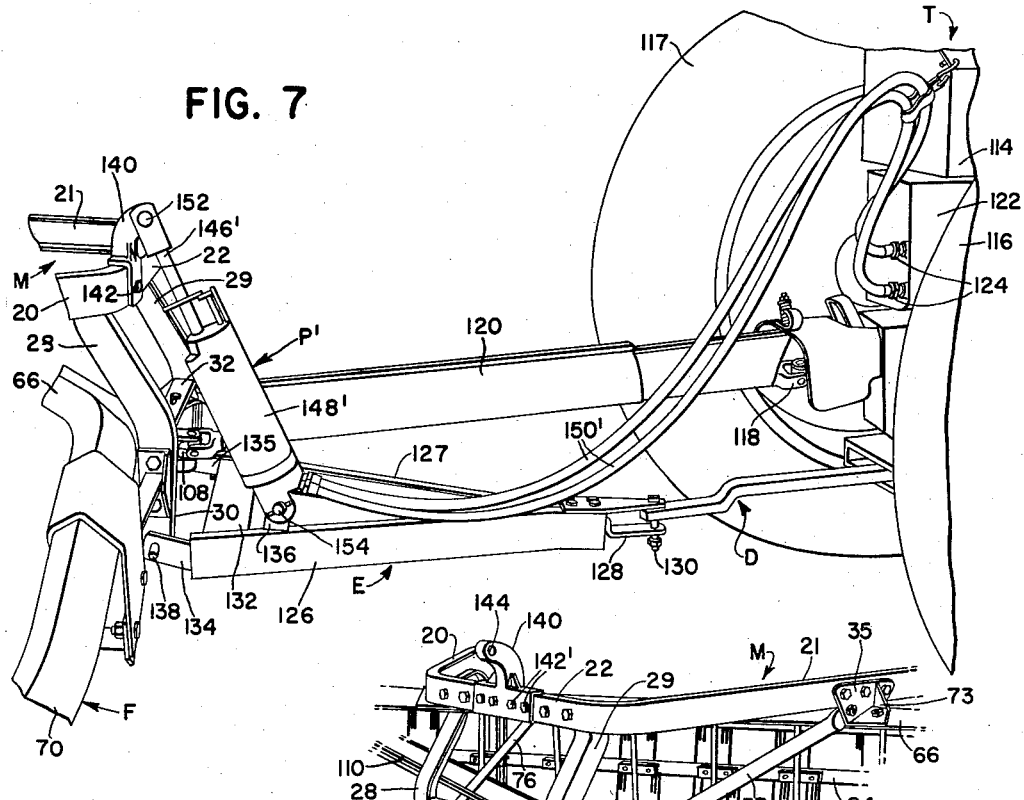
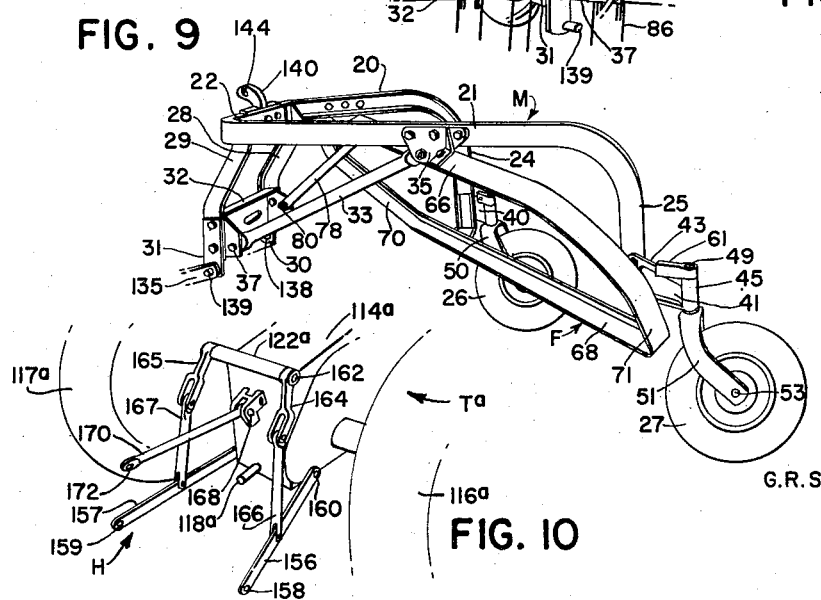
INVENTORS
G.R. SUTHERLAND &
A.E. BREED United States Patent Office 2,833,107
Patented May 6, 1958

2,833,107

SIDE-DELIVERY RAKE

Gail R. Sutherland and Arie E. Breed, Ottumwa, Iowa, assignors to Deere Manufacturing Co., Dubuque, Iowa, a corporation of Iowa Application April 19, 1956, Serial No. 579,352

16 Claims. (Cl. 56—377)

This invention relates to an improved side-delivery rake and more particularly to a rake structure that may be readily adapted for use with a variety of tractors, so as to be convertible from an integral rake to a semi-integral rake.

The increasing popularity of the so-called three-point hitch tractor has entailed the design and manufacture of implements especially designed for adaptation to the three-point hitch. However, this trend has been accompanied by the problems of how to use older implements with the new tractors and vice versa.

According to the present invention, an improved side-delivery rake design has been provided which incorporates therein hitch structure adapting the rake for use with either a three-point hitch tractor or a "straight" drawbar tractor. In the use of the rake with a three-point hitch tractor, adjustment of the rake between operating and transport positions is accomplished by raising and lowering the hitch device by the means incorporated in the tractor. Such a rake and its adaptation to the tractor is known as an integral rake or an integral hitch connection, primarily because the forward part of the rake, during operation, is supported on the tractor and, in transport, the entire weight of the rake may be supported on the raised hitch structure.

In a semi-integral rake, as distinguished from the integral rake, the forward end of the rake is supported at all times on the drawbar of the tractor and, normally, any power lift device on the tractor is not readily available for raising and lowering the rake. The present invention overcomes this problem by the provision of an intermediate hitch element connectible between the tractor and the rake in such fashion that a force-transmitting device may be applied between the rake frame and the hitch element for adjusting the rake frame vertically. In one form of the invention, the force-transmitting means is manually operative. In another form, the force-transmitting means is a fluid-pressure motor deriving power from the power lift system on the tractor. The invention features a basic rake design which may readily adapt itself to either the hitch element for the semi-integral connection or to the draft and hitch links of a three-point hitch tractor, all without modification of either the tractor or the rake. The invention also features means for locking the castering wheels on the rake against castering when the rake is used in its semi-integral aspect. Other objects reside in the over-all improvement of a simple and economical rake frame, mounting of the reel and rotatable elements thereof; and arrangement of drive means for the reel.

The foregoing and other important objects and desirable features inherent in and encompassed by the invention will become apparent as preferred embodiments of the invention are disclosed in detail in the ensuing specification and accompanying sheets of drawings, the several figures of which will be described immediately below.

Fig. 7 is an enlarged fragmentary perspective showing the relationship between the semi-integral rake and one form of tractor, the view also illustrating the power-operated force-transmitting means.

Fig. 8 is a fragmentary left front perspective of the rake structure.

Fig. 9 is a left perspective of the "skeleton" of the rake frame and reel frame.

Fig. 10 is a right rear perspective of a typical three-point hitch tractor.

Figure 1:
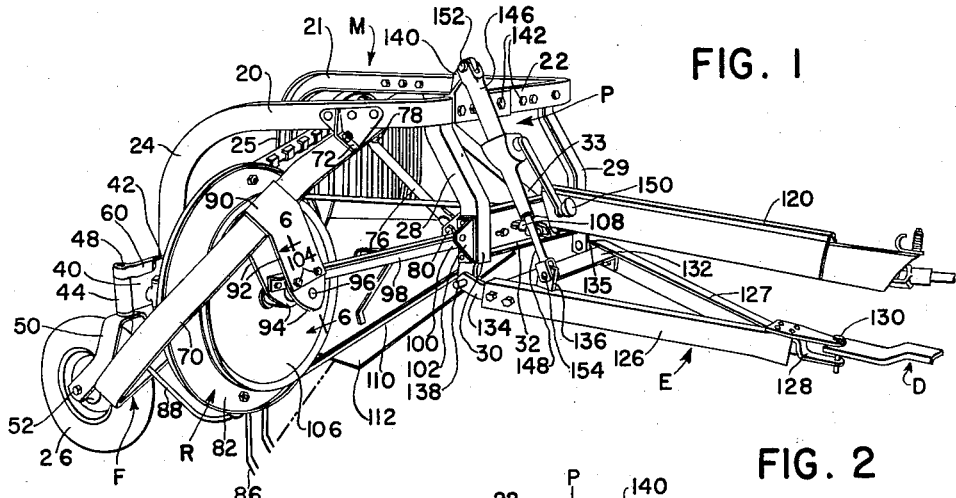
Fig. 1 is a right front perspective of the semi-integral rake, showing one form of force-transmitting means.

The rake shown has the same basic structure in all figures, comprising a fore-and-aft main frame M adapted to be drawn over a field by either of two basically different types of tractors, one of which is designated in its entirety in Fig. 7 by the letter T and other of which is designated in its entirety in Fig. 10 by the letters Ta. For the present, the rake will be described in connection with the tractor T.

The main frame U-shaped as view from above and has a pair of laterally spaced apart fore-and-aft extending legs 20 and 21 which afford the upper part of the main frame, this part being disposed at a substantial height above the ground. The main frame includes a transverse bight 22 which affords the front end of the rake. This bight is at the same level as that of the legs 20 and 21. The legs 20 and 21 curve downwardly at their rear ends to provide laterally spaced apart depending rear end supports 24 and 25, these supports terminating above the ground at a level below that of the upper legs 20 and 21, so as to be supported respectively on ground wheels 26 and 27 of the castering type, as will be explained below.

The front end of the main frame M, in addition to including the transverse bight 22, is defined by a pair of uprights 28 and 29, each of which constitutes a depending front end portion terminating above the ground at a level but slightly higher than that of the depending rear supports 24 and 25, the uprights 28 and 29 respectively having lower end portions 30 and 31 for purposes to presently appear. These front ends are rigidly cross-connected by a transverse member 32 and the whole thus provides a support depending from the main frame bight 22. A rearwardly and upwardly inclined brace 33 is rigidly connected at its rear end at 35 to a portion of the leg 21 rearwardly of the bight 22, and the lower forward end of the brace 33 is rigidly connected at 37 to the lower end 31 of the upright 29, thus affording a rigid triangular structure appropriately bracing the upright 29 relative to the leg 21.

Figure 3:
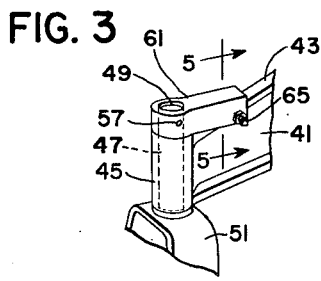
Fig. 3 is an enlarged fragmentary perspective of one of the caster wheel mountings for the semi-integral version.

The rear end depending portions 24 and 25 respectively include rearwardly extending members 40 and 41, and these members respectively have top edges 42 and 43 and respectively terminate in upright tubular rear ends 44 and 45. As best shown in Fig. 3, for example, which is representative of the structure at both sides of the rake, the tubular portion 45 affords an upright bore 47 which journals an upright shaft 49 provided as part of a mounting means 51 for the wheel 27. As will be clear without further description, the mounting means comprises a conventional fork journalling the wheel 27 on a transverse axis provided by a wheel shaft 53. A portion of the upright shaft for the other wheel 26 is visible at 48, the wheel mounting means at 50 and the wheel mounting shaft for the wheel 26 at 52.

Figure 5:
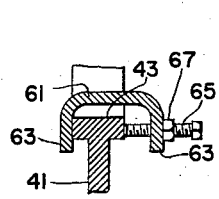
Fig. 5 is an enlarged section on the line 5—5 of Fig. 3.
Figure 4:
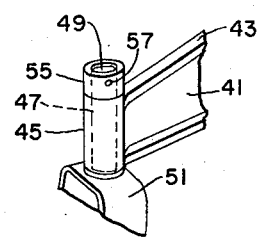
Fig. 4 is a view similar to Fig. 3 but showing the conversion of the caster wheel mounting for the integral version of the rake.

Fig. 4 shows a representative arrangement in which the wheel 27 is allowed to caster about the upright axis afforded by its shaft 49. For this purpose, the shaft is secured against axial displacement by means of a collar 55, pinned to the shaft as at 57. It will be understood that the arrangement at the other side of the rake is the same. The castering effect will be used when the rake assumes its integral version, as will be explained hereinafter. Fig. 3 shows the locking arrangement when the rake assumes its semi-integral version. For this purpose, the upper end of the shaft 49 has pinned thereto, as at 57, a forwardly extending locking arm 61, having depending side portions 63 afforded by the inverted U-shaped section of the arm. As seen in Fig. 5, the arm embraces the top edge 43 of the member 41 from above. Releasable securing means, here in the form of a set screw 65, is threaded through one of the depending portions 63 and engages the side of the member 41, a lock nut 67 being provided to retain the position of the screw 65. Here again, it will be understood that the arrangement at the opposite side of the rake is the same as that just described, a lock arm 60 being readily visible and having the detailed structure of the lock arm 61.

The main frame M supports, via a reel frame F, rake mechanism R, which may be of any conventional construction as far as concerns the present invention. The reel frame F is roughly in the form of a parallelogram having rounded corners, the structure being afforded by generally transverse front and rear cross members 66 and 68 and opposite generally fore-and-aft end members 70 and 71. The frame F is appropriately supported by the frame M at four points, including a connection 72 to the fore-and-aft leg 20, a connection 73 to the other fore-and-aft leg 21, and connections 74 and 75 to the lower ends of the rear end supports 24 and 25 (Fig. 2). The connection 35 may be in common with the connection 73. A rearwardly and upwardly inclined brace 76 is connected at its rear end at 78 to the front member 66 of the frame F and is connected at its lower end at 80 to the lower end of the front upright 28 (Figs. 1 and 9).

Figure 2:
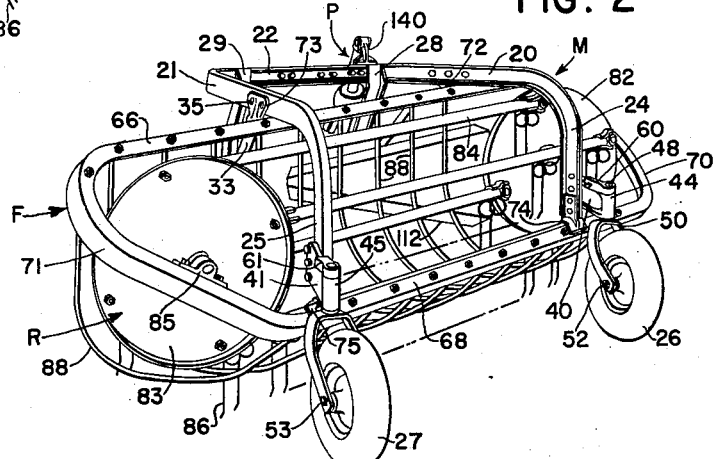
Fig. 2 is a left rear perspective of the rake shown in Fig. 1.

As will be clear from Figs. 1 and 9, the end member 70 of the rake frame F constitutes an outer end generally transversely alined with the uprights 28 and 29. Fig. 9 in particular, and in conjunction with Fig. 2, illustrates that the opposite end member 71 provides an opposite outer end generally in transverse alinement with the rear depending portion 25 of the main frame M. These outer ends are utilized to support the rake mechanism R, the essentials of which include a pair of transversely spaced apart rotatable elements or spiders 82 and 83, rotatable respectively on generally fore-and-aft extending axes, the spiders being fore-and-aft offset, as is generally conventional, and being connected by transverse rake bars 84. Each bar carries a plurality of rake teeth 86 which operate in interspaced relationship with a plurality of stripper bars 88, which arrangement is typical of many well-known rakes and need not be described in detail. Journalling of the rearmost spider 83 is accomplished by a suitable bearing 85 on the end member 71 (Fig. 2).

Figure 6:
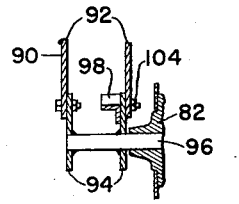
Fig. 6 is an enlarged section on the line 6—6 of Fig. 1.

The forward spider 82 is carried by a mounting member 90 which is in the form of a U embracing and rigidly secured to the end 70 of the frame F and having a pair of depending legs 92, the lower ends 94 of which support shaft means 96 for journalling the spider 82. Figs. 1 and 6 best show the construction. As will be clear from Fig. 1, the lower ends 94 of the mounting member 90 are generally in horizontal alinement with the lower end 30 of the upright 28, and the portion 30 and the lower end of the mounting member 90 are rigidly cross-connected by an intervening brace 98, the inner end 100 of which is rigidly secured, as by welding, to a bracket 102 on the upright 30 and the outer end of which is rigidly secured, as by bolting at 104, to one of the legs 92 of the member 90 (Fig. 6). The reel spider 82 has coaxial therewith and secured thereto a driven member 106. A rotatable driving member 108 is journaled intermediate the legs 28 and 29 by the transverse member 32 (best shown in Fig. 8). Drive means in the form of a belt 110 interconnects the driving and driven members, it being noted that the brace 98 counteracts the tension of the drive means 110. An appropriate shield 112 protects the drive means from behind.

The tractor T, shown in Fig. 7, is representative of one type of tractor having what may be termed a "straight" drawbar, here represented by the letter D. Tractors of this type are adapted to draw a variety of implements but have no special provision for integrally mounting the implements on the rear thereof in the manner of the three-point hitch, designated in its entirety by the letter H, as shown for the tractor Ta in Fig. 10. The rake will first be described in terms of its semi-integral version and as such attachable to the tractor T via the drawbar D.

The tractor T is conventionally provided with a fore-and-aft body 114 carried at its rear end between traction wheels 116 and 117 and including a rearwardly projecting power take-off shaft 118 for connection to the driving member 108 of the rake, the driving connection in Fig. 7 being enclosed in an appropriate safety shield 120. The tractor T is also conventionally equipped with a fluid pressure system such as shown in U. S. Patent 2,532,552, a housing portion of which system is visible here at 122 as including a pair of fluid line couplings 124.

The basic element of interconnection between the semi-integral rake and the tractor T is afforded by a generally fore-and-aft extending hitch element designated in its entirety by the letter E and best shown in Figs. 1 and 7. This element is substantially an A frame having forwardly converging side members 126 and 127, rigidly interconnected at their front ends to afford a clevis 128 for articulate connection to the rear end of the drawbar D as via a connecting pin 130. A cross member 132 rigidly interconnects the rear ends of the side members 126 and 127 and these members are respectively provided with rearwardly projecting apertured ears 134 and 135. The right hand side member 126 is provided intermediate its ends with an upright apertured ear 136. As will be seen, the element E is a self-contained structural member adapted, as will be clear from Fig. 7, to be interposed between the front end of the rake and the drawbar D of the tractor T. The means for effecting the connections and for adjusting the rake relative to the element E will now be described.

The depending lower front ends of the uprights 28 and 29 respectively have transverse pivot members or pintles 138 and 139. These pintles are alined on a first transverse axis and afford a pivotal connection inherent in the front end of the main frame M. In addition to the two pintles 138 and 139, the main frame M includes an upper connecting element 140, which element is secured, as by bolts 142, to an intermediate portion of the bight 22 of the main frame. This element is apertured at 144 on a second transverse axis above the transverse axis afforded by the pintles 138 and 139.

When the element E is pivotally connected to the front end of the rake via the pintles 138 and 139, it extends forwardly from the rake generally at the level of the pintles to its free front end 128 which, as previously described, is connected to and supported on the rear end of the draft member or drawbar D. The element E thus constitutes a draft element by means of which the rake may be drawn by the tractor T. In addition, the element E provides one part of means for adjusting the vertical position of the rake for varying the relationship between the rake teeth 86 and the ground over which the teeth are operating. Moreover, the adjustment affords a transport position for the rake in which the teeth are raised to a substantial height so as to be absolutely clear from the ground during travel of the tractor-drawn rake over roads and highways or across fields in which the raking operation is unnecessary.

The other essential part of the adjustment is a force-transmitting means, which may take either the form of a manually operative means P or a power operated means P', the former being shown in Figs. 1 and 2 and the latter in Fig. 7.

Because the mounting ear 136 on the right hand side member 126 of the draft element E is offset to one side, it is desirable when using either of the devices or means P or P' to shift the element 140 to the same side as the ear 136, which can be readily accomplished because of the removable connections afforded by the bolts 142. Accordingly, as will be clear in Figs. 1 and 2 in particular, the element 140 is so offset, whereas in Fig. 8 it is centrally located, for reasons to presently appear.

The force-transmitting means P is here shown as a typical screw jack having relatively movable upper and lower parts 146 and 148 which may be extended and retracted by an operating handle 150 to vary the length of the means P. The upper end of the upper part 146 is connected by a pivot pin 152 to the connecting element 140 on the aforesaid transverse axis; and the lower end of the lower part 148 is pivotally connected by a pin 154 to the ear 136, thus affording a third transverse axis. Consequently, the arrangement establishes a triangle having its apices at 138, 152 and 154. Shortening or lengthening of the means P, by means of the handle 150, changes the length of the hypotenuse between 152 and 154, and accordingly varies the included angle between the upright 28 and the element E. Because of the axis at 138—139 and the articulate connection at 130, which automatically includes a transverse axis, the height of the main frame M can be altered by the means P.

The fluid pressure operated device P' includes relatively movable parts 146' and 148', the former constituting the piston rod of a piston (not shown) contained in the latter, which is a fluid cylinder supplied by fluid lines 150' that are connected to the fluid line couplings 124 of the fluid pressure system 122 (Fig. 7). The cylinder 148' is connected to the ear 136 on the element E by the pin 154, and the free end of the piston rod is connected to the element 140 by the pin 152. Here again, extension or retraction of the device P' will accomplish adjustment of the main frame of the rake in the manner described in connection with the operation of the device or means P.

The convertibility of the semi-integral rake to an integral rake for attachment to the three-point hitch H of the tractor Ta shown in Fig. 10 will be readily apparent from Figs. 1 and 8. The hitch H conventionally has a pair of rearwardly trailing draft links 156 and 157, respectively transversely apertured in alinement at 158 and 159. The links are pivotally connected to the tractor body 114a on a transverse pivot axis, the general location of which is visible at 160 in Fig. 10. The tractor has a conventional power lift system 122a which includes a transverse rockshaft 162 having transversely spaced lift arms 164 and 165 which are respectively connected by lift links 166 and 167 to the draft links 156 and 157. A central supporting portion 168 on the tractor body 114a affords a forward pivotal connection for a typical top link 170, the rear end of which has therein a suitable aperture 172. The tractor is conventional and has its body 114a carried between traction wheels 116a and 117a. A power take-off shaft 118a is adapted for connection to the reel mechanism driving member 108, as will be readily apparent.

It will be seen, upon an examination of Fig. 10, that the three-points 158, 159 and 172 are triangularly spaced generally on the order of the triangular relationship between the points 138, 139 and 144 as shown in Fig. 8. These latter three points are exposed, of course, when the hitch element E and power device P or P' are removed. Hence, the draft and top links may be connected to the pintles and to the point 144, as by the upper pin 152 or by a typical ball and socket connection (not shown) conventionally afforded in the rear end of a top link such as that at 170. Likewise, the rear ends of the draft links 156 and 157 conventionally have ball and socket connections at 158 and 159. These details are believed to be immaterial, since they are well-known and their utilization or substitution here will be obvious.

When the rake assumes its integral version and is connected to the tractor via the three-point hitch H of Fig. 10, the rake becomes in effect a part of the tractor; hence, the designation "integral." At this time, the lock arms 60 and 61 are removed from the caster wheels and are replaced by collars as in Fig. 4, so that the wheels are free to caster. In the semi-integral version, the lock arms are used, since relative transverse articulation between the tractor and the rake is afforded at the connection 130.

It will be seen from the foregoing that an inexpensive rake has been provided, which is readily convertible from the integral to the semi-integral type. In its integral version, adjustment of the rake is accomplished by means of the three-point hitch and the power lift system 122a. In the semi-integral version, adjustment is effected by either of the devices P or P'. The conversion is readily made from one form to the other or back again without the alteration of any of the component parts and as such the rake is thereby adapted for use with not only a variety of tractors but with tractors of extremely different types.

Features of the invention not categorically enumerated herein will undoubtedly occur to those versed in the art, as will many modifications and alterations in the preferred embodiments disclosed, all of which may be achieved without departure from the spirit and scope of the invention.

What is claimed is:

1. A side-delivery rake adapted to be supported in part on and drawn by a tractor for advance over a field, comprising: a main frame having a generally fore-and-aft upper part disposed at a substantial height above the ground and including laterally spaced apart depending rear end supports terminating above the ground and further including a pair of depending front end portions also terminating above the ground; a pair of ground-engaging wheels respectively connected to the rear end supports and sustaining the aft part of the frame; rake mechanism carried by the frame ahead of the wheels and behind said front end portions; a fore-and-aft draft element having rear end portions laterally spaced apart on the order of and pivotally connected on a first transverse axis respectively to the main frame front end portions, said element extending forwardly generally at the level of said front end portions and having a free front end including means thereon adapted for support on and connection to the tractor for vertical movement relative to the tractor about a second transverse axis ahead of the first axis; and force transmitting means having an upper end connected to the upper portion of the main frame and a lower end connected to the draft element ahead of said first axis, said force-transmitting means including relatively movable parts operative to vary the distance between the upper and lower ends of said means for varying the angle between said frame and element about said first axis and thus to vary the vertical position of the frame and rake mechanism relative to the ground.

2. The invention defined in claim 1, in which: the lateral spacing and general level of the depending front end portions are generally on the order of the lateral spacing and level of the draft links of a conventional three-point hitch; the upper frame part has a central upper front portion appropriate to the top link of such three-point hitch; the upper end of the force-transmitting means is removably connected to said upper front portion and the rear end portions of the draft element are removably connected to the main frame depending front end portions so that said element and force-transmitting means are removable to convert the main frame for attachment directly to such three-point hitch via said depending front end and upper front portions; the ground-engaging wheels are caster wheels; and releasable lock means are provided for said wheels and are selectively operative to lock the wheels against castering when the main frame is supported via the draft element and for releasing the wheels for castering when said frame is converted for attachment to the three-point hitch.

3. The invention defined in claim 2, in which: a connecting element is provided at the upper front portion of the main frame and said connecting element is laterally positionable to accommodate the top link of the three-point hitch or the upper end of the force-transmitting means.

4. The invention defined in claim 1, in which: the force-transmitting means is a fluid motor of the cylinder and piston type in which the relatively movable parts are respectively the cylinder and piston, and the cylinder includes fluid-transmitting means connectible to deliver fluid under pressure to the cylinder from a fluid-pressure system on the tractor.

5. A side-delivery rake adapted to be supported in part on and drawn by a tractor for advance over a field, comprising: a generally fore-and-aft main frame having front and rear ends, said rear end including a pair of supports spaced apart transverse to the line of advance; a pair of ground-engaging wheels connected respectively to the supports and sustaining the rear end of the frame; rake mechanism carried by the frame ahead of the wheels and behind said front end of the frame; a fore-and-aft draft element having a rear end pivotally connected on a first transverse axis to the front end of the main frame and extending forwardly to a free front end, said draft element front end having means thereon adapted for support on and connection to the tractor for vertical movement relative to the tractor about a second transverse axis ahead of the first axis; and force-transmitting means connected between the frame and element and adjustable as to length to vary the angle between said frame and element about said first axis and thus to vary the vertical position of the frame and rake mechanism relative to the ground.

6. A side-delivery rake, comprising: a U-shaped main frame having fore-and-aft legs and a transverse bight and arranged with the bight as a front end for said frame and with the legs as transversely spaced apart rear end supports; a pair of uprights spaced transversely apart and depending from the bight to transversely spaced and alined lower ends; a transverse member rigidly cross-connecting said lower ends; a reel frame supported below and generally transverse to the fore-and-aft legs and having an outer end portion substantially in transverse alinement with the uprights; reel mechanism carried by the reel frame and having a rotatable element adjacent to said reel frame outer end; a U-shaped mounting member rigid on and having legs depending from said outer end to spaced apart lower ends substantially horizontally alined with the lower ends of the uprights; shaft means mounted on the lower ends of the legs of the mounting member and supporting the rotatable element; and a transverse brace connected at one end to one of the uprights and at its other end to the mounting member adjacent to the shaft means.

7. A side delivery rake, comprising: a U-shaped main frame having fore-and-aft legs and a transverse bight and arranged with the bight as a front end for said frame and with the legs as transversely spaced apart rear end supports; a pair of uprights spaced transversely apart and depending from the bight to transversely spaced and alined lower ends; a transverse member rigidly cross-connecting said lower ends; a reel frame supported below and generally transverse to the fore-and-aft legs and having an outer end portion substantially in transverse alinement with the uprights; reel mechanism carried by the reel frame and having a rotatable element adjacent to said reel frame outer end; a mounting member rigid on and depending from said outer end to a lower end substantially horizontally alined with the lower ends of the uprights; shaft means mounted on the lower end of the mounting member and supporting the rotatable element; and a transverse brace connected at one end to one of the uprights and at its other end to the mounting member adjacent to the shaft means.

8. The invention defined in claim 7, including: a rearwardly and upwardly inclined brace connected at its rear end to the reel frame and at its lower end to the lower end of the upright member to which the transverse brace is connected.

9. The invention defined in claim 8, including: an additional rearwardly and upwardly inclined brace connected at its rear end to the main frame and at its lower end to the lower end of the other upright member.

10. The invention defined in claim 7, including: a driving member rotatably carried by the transverse member; a driven member coaxial with and connected to the rotatable element; and drive means interconnecting the driving and driven members.

11. A side-delivery rake adapted to be supported in part on and drawn by a tractor for advance over a field, comprising: a generally fore-and-aft main frame having front and rear ends, said rear end including a pair of supports spaced apart transverse to the line of advance, each support having a rearwardly extending member including a top edge and terminating in a rear end portion provided with an upright bore; a pair of ground-engaging wheels, one for each support; a pair of means respectively connecting the wheels to the supports, each means journaling its wheel on a transverse axis and including an upright shaft journaled in the respective bore, each shaft projecting above the top edge of the respective rearwardly extending member; and a pair of locking arms releasably secured respectively to the upper ends of the shafts and extending forwardly respectively over said top edges, each locking arm having depending side portions embracing the respective member from above to prevent rotation of the respective shaft.

12. The invention defined in claim 11, in which: each locking arm is of inverted U-shaped cross-section to afford said depending side portions, one of the side portions of each arm has securing means therein selectively engageable with and releasable from the associated rearwardly extending member.

13. A side delivery rake, comprising: a U-shaped main frame having fore-and-aft legs and a transverse bight and arranged with the bight as a front end for said frame and with the legs as transversely spaced apart rear end supports; a support secured to and depending from the bight and having a lower end portion; a reel frame supported below and generally transverse to the fore-and-aft legs and having an outer end portion spaced laterally outwardly from the support; reel mechanism carried by the reel frame and having a rotatable element adjacent to said reel frame outer end; a mounting member rigid on and depending from said outer end and likewise spaced laterally outwardly from the support; shaft means mounted on the mounting member and supporting the rotatable element; and a transverse brace having opposite ends connected respectively to the mounting member and support.

14. A side delivery rake, comprising: a U-shaped main frame having fore-and-aft legs and a transverse bight and arranged with the bight as a front end for said frame and with the legs as transversely spaced apart rear end supports; a support secured to and depending from the bight and having a lower end portion; a reel frame supported below and generally transverse to the fore-and-aft legs and having an outer end portion spaced laterally outwardly from the support; reel mechanism carried by the reel frame and having a rotatable element adjacent to said reel frame outer end; means supporting the rotatable element on said reel frame outer end; a transverse brace extending between and having opposite ends respectively proximate to the reel frame outer end and the support; means connecting one end of the brace to said reel frame outer end; and means connecting the other end of said brace to said support.

15. The invention defined in claim 14, including: a fore-and-aft brace connected at its rear end to the reel frame behind the support and at its front end to the support below the bight of the main frame.

16. The invention defined in claim 14, including: a driving member carried by the support; a driven member coaxial with and connected to the rotatable element; and drive means interconnecting the driving and driven members.

References Cited in the file of this patent

UNITED STATES PATENTS

| | | |
|---|---|---|
| 2,334,888 | Strandlund | Nov. 23, 1943 |
| 2,541,481 | Richardson | Feb. 13, 1951 |
| 2,546,531 | Vutz | Mar. 27, 1951 |
| 2,639,575 | Richey | May 26, 1953 |
| 2,759,318 | Oppel | Aug. 21, 1956 |